US012752771B2

(12) United States Patent
A

(10) Patent No.: US 12,752,771 B2
(45) Date of Patent: Oct. 6, 2026

(54) VEHICLE CONTROL SYSTEM FOR TIRE INSTABILITY INCIDENTS

(71) Applicant: FCA US LLC, Auburn Hills, MI (US)

(72) Inventor: Harikannan A, Ranipet (IN)

(73) Assignee: FCA US LLC, Auburn Hills, MI (US)

( * ) Notice: Subject to any disclaimer, the term of this patent is extended or adjusted under 35 U.S.C. 154(b) by 64 days.

(21) Appl. No.: 18/606,219

(22) Filed: Mar. 15, 2024

(65) Prior Publication Data

US 2025/0289410 A1 Sep. 18, 2025

(51) Int. Cl.

| | |
|---|---|
| ***B60W 30/02*** | (2012.01) |
| ***B60Q 1/50*** | (2006.01) |
| ***B60Q 5/00*** | (2006.01) |
| ***B60R 21/01*** | (2006.01) |
| ***B60T 7/12*** | (2006.01) |
| ***B60W 10/18*** | (2012.01) |
| ***B60W 10/20*** | (2006.01) |
| ***B60W 10/30*** | (2006.01) |
| ***B60W 30/09*** | (2012.01) |
| ***B60W 50/14*** | (2020.01) |

(52) U.S. Cl.

CPC ............. *B60W 30/02* (2013.01); *B60Q 1/543* (2022.05); *B60Q 5/005* (2013.01); *B60R 21/01* (2013.01); *B60T 7/12* (2013.01); *B60W 10/18* (2013.01); *B60W 10/20* (2013.01); *B60W 10/30* (2013.01); *B60W 30/09* (2013.01); *B60W 50/14* (2013.01); *B60W 2050/143* (2013.01); *B60W 2530/20* (2013.01); *B60W 2710/20* (2013.01); *B60W 2720/10* (2013.01)

(58) Field of Classification Search

CPC ...... B60W 30/02; B60W 30/09; B60W 10/18; B60W 10/20; B60W 10/30; B60W 50/14; B60W 2050/143; B60W 2530/20; B60W 2710/20; B60W 2720/10; B60Q 1/543; B60Q 5/005; B60R 21/01; B60T 7/12

USPC ..... 701/26, 45; 180/271, 280, 275; 280/734, 280/735; 340/426.33, 442, 443, 445; 116/34 R; 70/138, 130; 73/49, 146, 73/146.2

See application file for complete search history.

(56) References Cited

U.S. PATENT DOCUMENTS

| | | | | |
|---|---|---|---|---|
| 4,246,567 | A * | 1/1981 | Miller | B60C 23/20 |
| 7,069,134 | B2 * | 6/2006 | Williams | B60W 30/08 |
| 9,811,086 | B1 * | 11/2017 | Poeppel | G07C 5/0808 |
| 10,737,652 | B1 * | 8/2020 | Piper | B60R 21/0136 |
| 2003/0050743 | A1 * | 3/2003 | Caretta | B60T 8/241 |
| 2004/0216520 | A1 * | 11/2004 | Caretta | B60R 25/00 |

(Continued)

FOREIGN PATENT DOCUMENTS

| | | | | |
|---|---|---|---|---|
| CN | 104773168 A | | 7/2015 | |
| CN | 107719037 A | * | 2/2018 | B60C 23/0486 |

(Continued)

*Primary Examiner* — Ellis B. Ramirez

(74) *Attorney, Agent, or Firm* — Jeremy J. Klobucar

(57) ABSTRACT

A method of controlling a vehicle during a tire instability incident includes detecting a tire instability incident and activating a vehicle control measure. The tire instability incident can be detected as a function of one or both of tire pressure outside of a threshold pressure, and tire temperature above a threshold temperature. Activating the vehicle control measure includes one or a combination of two or more of: a) actuating a safety system; b) actuating an external alert; and c) reducing a vehicle speed.

17 Claims, 3 Drawing Sheets

(56) References Cited

U.S. PATENT DOCUMENTS

| | | | | |
|---|---|---|---|---|
| 2006/0180371 | A1* | 8/2006 | Breed | G07C 5/008 |
| 2008/0059034 | A1* | 3/2008 | Lu | B60T 8/17552 |
| 2019/0084556 | A1* | 3/2019 | Liu | B60W 40/09 |
| 2019/0235499 | A1* | 8/2019 | Kazemi | G01S 17/931 |
| 2020/0094796 | A1* | 3/2020 | Diedrich | G05D 1/0088 |
| 2021/0188252 | A1 | 6/2021 | Lu et al. | |
| 2021/0213935 | A1* | 7/2021 | Lu | B60C 23/04 |
| 2023/0001752 | A1* | 1/2023 | Dolberg | B60C 23/0415 |
| 2023/0083520 | A1* | 3/2023 | Yuasa | B62M 9/123 |
| 2024/0051574 | A1* | 2/2024 | Lee | G08G 1/0129 |

FOREIGN PATENT DOCUMENTS

| | | | |
|---|---|---|---|
| GB | 2477722 | A | 8/2011 |
| WO | WO2019218695 | A1 | 11/2019 |

* cited by examiner

VEHICLE CONTROL SYSTEM FOR TIRE INSTABILITY INCIDENTS

FIELD

The present disclosure relates to a vehicle control system relating to incidents of tire instability.

BACKGROUND

Sudden loss of tire pressure or tire temperatures beyond a maximum temperature can result in vehicle and tire instability incidents that may result in a loss of control of the vehicle. During such instability incidents, there is a need to improve the vehicle response and safety for occupants of the vehicle and for others outside the vehicle.

SUMMARY

In at least some implementations, a method of controlling a vehicle during a tire instability incident includes detecting a tire instability incident and activating a vehicle control measure. The tire instability incident can be detected as a function of one or both of tire pressure outside of a threshold pressure, and tire temperature above a threshold temperature. Activating the vehicle control measure includes one or a combination of two or more of: a) actuating a safety system; b) actuating an external alert; and c) reducing a vehicle speed.

In at least some implementations, activating the safety system is accomplished by deploying at least one airbag in the vehicle. In at least some implementations, by actuating at least one seat belt pretensioner.

In at least some implementations, actuating an external alert is accomplished by actuating at least one light visible from outside of the vehicle. In at least some implementations, the at least one light includes hazard signals of the vehicle, and/or one or more of vehicle headlights and vehicle taillights.

In at least some implementations, actuating an external alert is accomplished by actuating an audio output device to create a sound detectable outside the vehicle. In at least some implementations, the audio output device is a vehicle horn.

In at least some implementations, the vehicle control measure includes providing an alert within an interior of the vehicle. In at least some implementations, the alert includes illuminating a warning indicator on a vehicle display, actuating an audible alarm or both. In at least some implementations, the alert includes directions for driver control of the vehicle.

In at least some implementations, reducing the vehicle speed is accomplished by actuating one or more brake assemblies of the vehicle. In at least some implementations, the one or more brake assemblies includes a parking brake system.

In at least some implementations, the vehicle control measure includes reducing the vehicle speed and also includes controlling a steering direction of the vehicle. In at least some implementations, the method includes monitoring the location of obstacles above a threshold size that are outside the vehicle, and wherein controlling the steering direction includes changing the steering angle of the vehicle to move the vehicle to an area without obstacles above the threshold size.

In at least some implementations, the threshold pressure relates to instantaneous tire pressure or a rate of tire pressure decrease.

In at least some implementations, a method of controlling a vehicle during a tire instability incident, includes detecting a tire instability incident as a function of one or both of tire pressure outside of a threshold pressure, and tire temperature above a threshold temperature, and activating an external alert detectable outside of the vehicle and reducing a speed of the vehicle.

In at least some implementations, the activating step also includes activating a safety system of the vehicle. In at least some implementations, the safety system includes an air bag and wherein the air bag is deployed when the vehicle speed is greater than a threshold vehicle speed and when a threshold rate of tire pressure decrease is exceeded.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
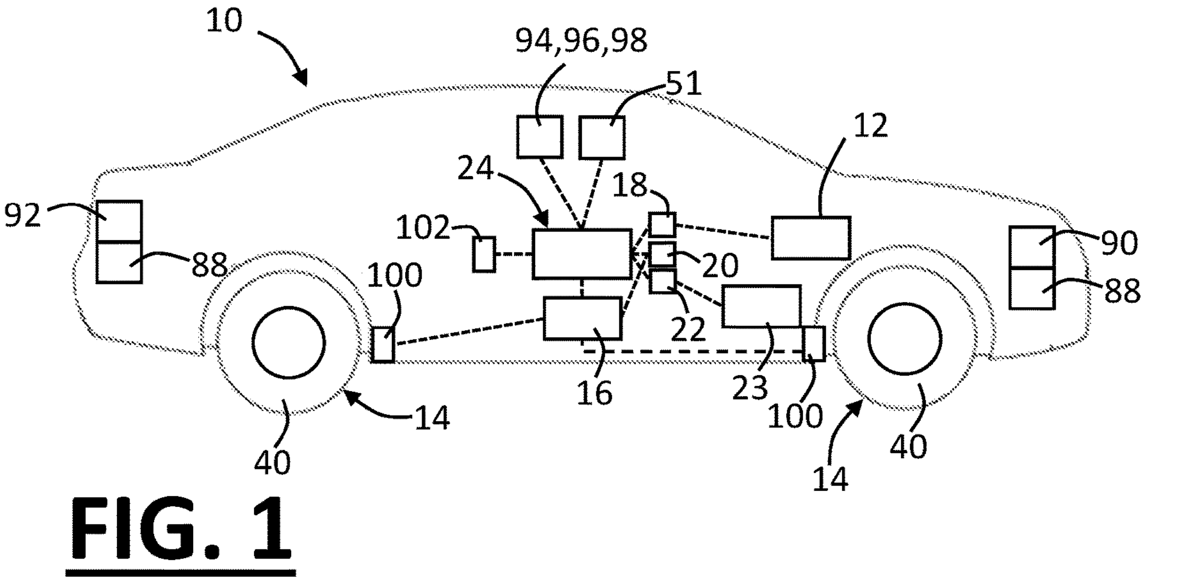
FIG. 1 is a diagrammatic view of a vehicle.

Referring in more detail to the drawings, FIG. 1 illustrates a vehicle 10 that includes a prime mover 12 that may include a combustion engine, one or more electric motors or both an engine and motor(s), as in a hybrid vehicle. The prime mover 12 is coupled to one or more of multiple vehicle wheels 14 to drive the wheels 14 for rotation and propel the vehicle 10. The vehicle 10 also includes a brake system 16 that functions to slow and stop the vehicle 10. The vehicle 10 includes a throttle input 18 (e.g. accelerator pedal) and a brake input 20 (e.g. brake pedal) that allow driver controlled operation of the prime mover 12 and the brake system 16, and a steering input 22 (e.g. steering wheel or the like) that permits control of the vehicle direction via a suitable steering system 23. The throttle, braking and steering functions may also be done semi or fully autonomously, if desired.

Figure 2:
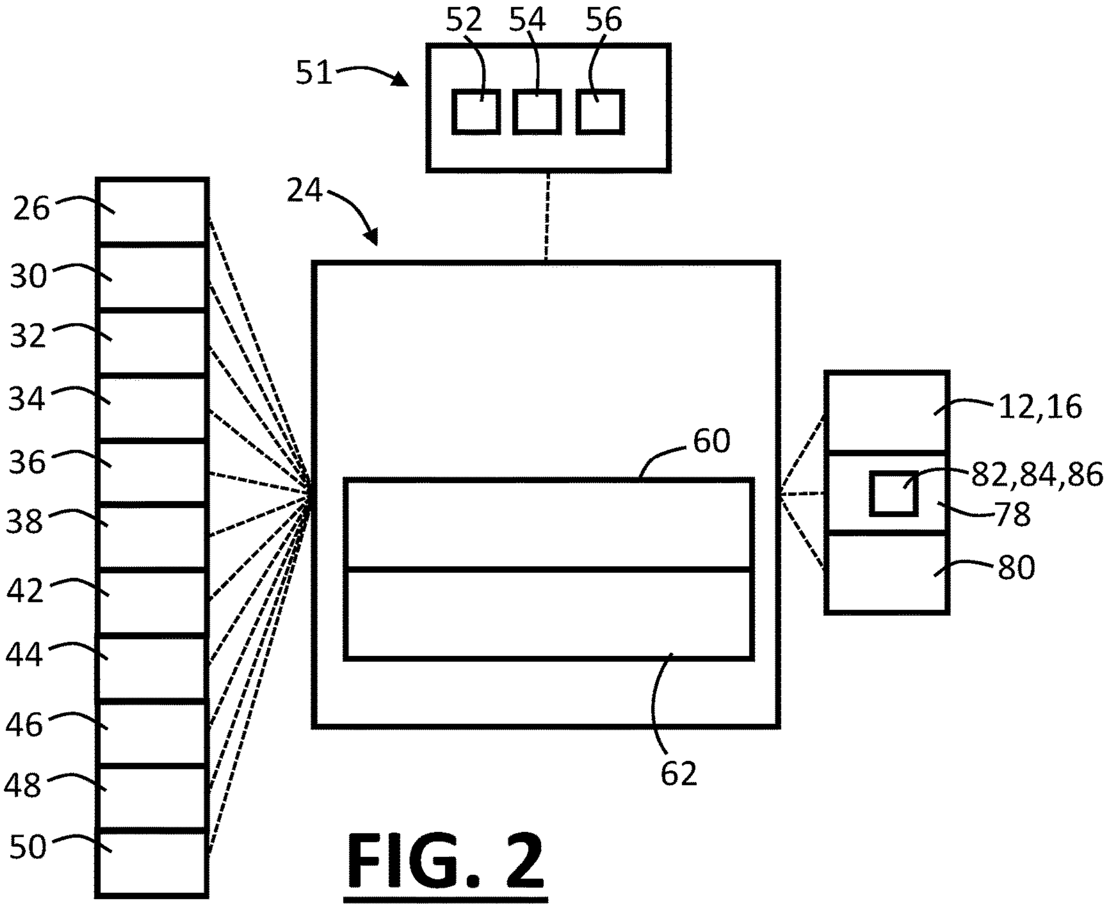
FIG. 2 is a diagrammatic view of some components of a control system of the vehicle.

To control various functions of the vehicle 10, the vehicle 10 has a control system 24 that, among other things, controls operation of the prime mover 12 of the vehicle 10. As shown in FIG. 2, multiple sensors may be communicated with the control system 24 to enable and facilitate control of the vehicle 10. By way of some examples, the vehicle 10 may include: a speed sensor 26 that provides an indication of vehicle speed; one or more accelerometers 30 responsive to vehicle accelerations in various directions and orientations; wheel speed sensors 32 responsive to the rotational speed of the vehicle wheels 14; drive input sensors (separate sensors, collectively referred to as 34) that sense the position and/or rate of movement of the throttle, brake and/or steering inputs

18, 20, 22; position or location sensors 36 or devices (such as GPS or the like) to determine the location of the vehicle 10; tire pressure sensors 38 that determine an internal pressure within the tire 40 of each wheel 14; tire temperature sensors 42 that determine the temperature within each tire 40; other temperature sensors 44 for various things like ambient temperature, engine/motor temperature, battery temperature and the like; steering angle sensor 46 to enable determination of an angle of a vehicle steering component; lane detection sensors 48 to detect a location and orientation of a road on which the vehicle 10 is traveling; object detection sensors 50 to detect at least objects of a size greater than threshold in proximity of the vehicle 10; and various other sensors that may be responsive to or useful in determining power output and/or energy consumption from the prime mover 12 (e.g. current draw of motors, or torque sensors).

Further, as shown in FIG. 2, the vehicle 10 may include an infotainment system 51 including audio and visual devices, like speakers 52, microphones 54 and one or more display screens 56, may be arranged within an interior of the vehicle 10. Information may be provided to vehicle occupants by the infotainment system 51, such as the status of various vehicle systems which may be based on information from vehicle sensors, like vehicle speed, fuel/energy level, engine temperature, oil pressure, tire pressure, tire temperature, direction of travel and the like. Warning or advisory information may also be provided audibly or visually on a display 56 in the vehicle 10, for example, when a system fault is detected or when a threshold is exceeded (e.g. a low fuel level threshold, a low tire pressure threshold, threshold related to engine or oil temperature, and the like). Various vehicle settings can be reviewed and changed via the infotainment system 51 such as climate control settings, entertainment options and settings, drive mode settings (e.g. comfort, sport, track powertrain and suspension settings), and the like.

Further, a navigation program may be provided via the infotainment system 51 or a remote device, such as a mobile phone, tablet or computer, and the remote device can be connected to the infotainment system 51 to enable the navigation program on the remote device to cause audio and/or video outputs via the vehicle infotainment system. The navigation program or other vehicle program may include information about the road on which the vehicle 10 is located, including number of lanes and the location of shoulders or other vehicle accessible areas adjacent to the roads. Such information could also be obtained or inferred from the object and lane detection sensors 48, 50.

In order to perform the functions and desired processing set forth herein, as well as the computations therefore, the control system 24 may include, but is not limited to, one or more controller(s), processor(s), computer(s) (generally referred to at 60), DSP(s), memory 62, storage, register(s), timing, interrupt(s), communication interface(s), and input/output signal interfaces, and the like, as well as combinations comprising at least one of the foregoing. For example, the control system 24 may include input signal processing and filtering to enable accurate sampling and conversion or acquisitions of such signals from communications interfaces and sensors. As used herein the terms control system 24 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 24 may be distributed among different vehicle modules, such as an infotainment control module for the infotainment system 51, engine control module or unit, brake control module, body control module, powertrain control module, transmission control module, and the like, if desired, and the memory and one or more processors may be one or both integrated into the vehicle 10 or remotely located and wirelessly communicated to the vehicle 10, as desired.

The term "memory" 62 or "storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system and/or instructions executable by a processor or controller or the like to enable control or allocate resources of a computing device.

Figure 3:
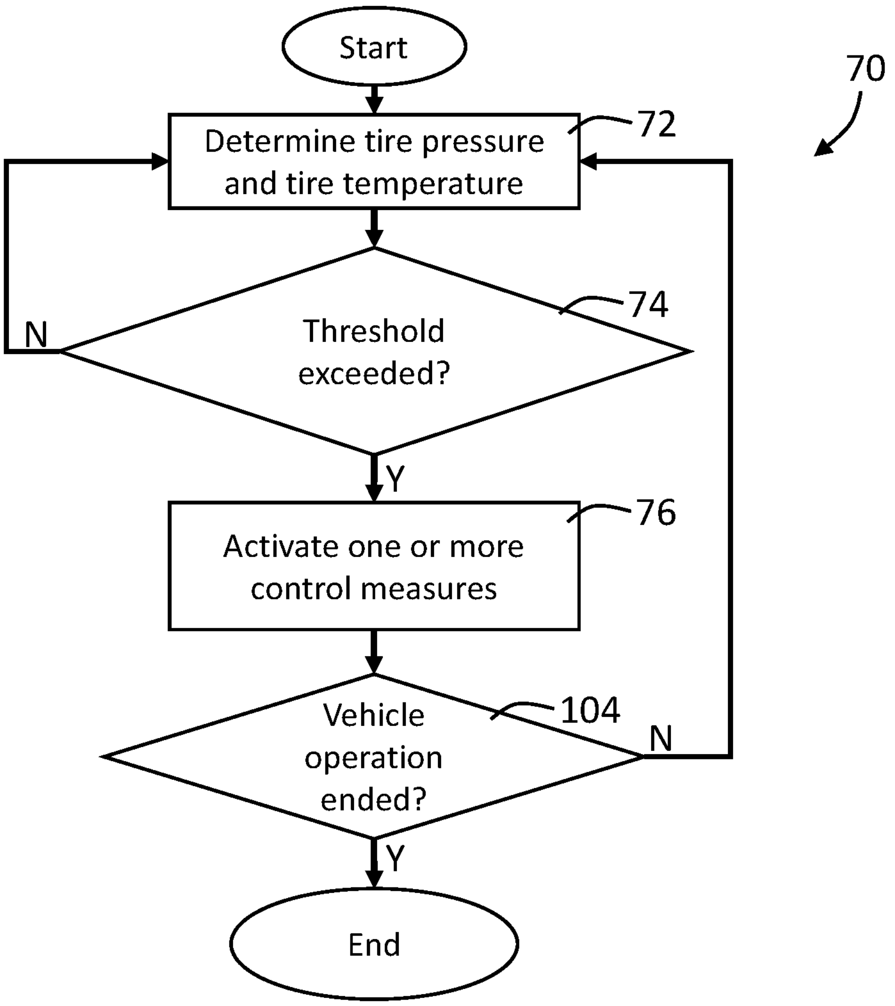
FIG. 3 is a flowchart of a method of controlling the vehicle during a tire instability incident.

FIG. 3 illustrates a method 70 of controlling a vehicle 10 when a tire instability incident is detected. In at least some implementations a tire instability incident may be determined by monitoring in step 72 tire pressure and tire temperature and determining in step 74 if one or more thresholds have been exceeded. In other words, if one or both of the following conditions exist: a tire pressure outside of a pressure threshold, and tire temperature above a threshold temperature. The pressure threshold may relate to an instantaneous tire pressure, where a tire pressure below the threshold is determined to relate to a tire instability incident. The pressure threshold may relate to a change in tire pressure between determinations of tire pressure, perhaps within consecutive iterations or within a certain number of iterations at which the tire pressure is determined (e.g. based on sensor interval or response time). The pressure threshold may relate to a rate of a decrease in tire pressure, where a decrease in pressure at a rate greater than the threshold rate is determined to relate to a tire instability incident.

When a vehicle 10 is initially started or turned on, the system and method 70 may check the pressure and temperature of each tire and provide notice (e.g. an alert) to the driver if the pressure within any tire 40 is below a threshold pressure or if the temperature of any tire 40 is above a threshold temperature, such as by illuminating a warning or fault indicator on a display 56 of the infotainment system 51 (e.g. dashboard display). In at least some implementations, more than one threshold may be provided for one or both of tire pressure and tire temperature, with a first threshold causing a notice/alert to be issued but permitting normal operation of the vehicle 10. In at least some implementations, if the pressure or temperature is outside of a second threshold or limit threshold for these parameters, which may be set at a level to prevent damage to or failure of a tire 40, wheel 14 or other vehicle components, and/or at a level at which the vehicle operation may be unstable due to the tire pressure or temperature condition, the system could be arranged to both provide an alert and inhibit or prevent vehicle operation until the condition is corrected. Here, inhibiting operation may require the vehicle operator to override the system to enable vehicle operation, which vehicle operation may be limited in speed or in duration or both, or the system may simply limit vehicle speed when the condition is determined to exist. This can permit the vehicle 10 to be moved a limited distance which may be desirable if the vehicle 10 is not in a safe location or in a location easily accessible by a service vehicle, or the vehicle 10 to be operated at a speed at which failure of a tire is unlikely to cause loss of vehicle control, by way of non-limiting examples.

Whether these steps upon the vehicle 10 being turned on or started are performed or not, the method may determine tire pressures and tire temperatures to determine occurrence of a tire instability incident during vehicle operation. When a tire instability incident is determined to have occurred/exist, the method continues to step 76 in which a vehicle control measure is activated. In at least some implementations, the vehicle control measure includes one or a combination of two or more of: a) actuating a safety system 78; b) actuating an external alert 80; and c) reducing a vehicle speed.

In at least some implementations, activating the safety system 78 is accomplished by deploying at least one airbag 82 in the vehicle 10, and/or by actuating at least one seat belt pretensioner 84 or other passenger safety device 86. This may be done when the instability incident is of a magnitude or type deemed critical or very likely to result in a vehicle accident. For example, a sudden loss of a high magnitude of tire pressure indicating a blowout or other rapid tire failure while the vehicle 10 is traveling at a speed above a threshold is more likely to lead to loss of vehicle control than a lower rate of tire pressure loss or when the vehicle 10 is traveling more slowly. Accordingly, for the most severe conditions in a determined tire instability, the system may implement more severe safety system activation. At least some airbags 82 may interfere with the view of and the ability of the vehicle operator to control the vehicle 10. Therefore, in at least some implementations, the airbags 82 are deployed only when the tire instability incident is determined to be severe and while the vehicle 10 is traveling above a threshold speed such that loss of control of the vehicle 10 is determined to be highly likely, or airbags are selectively deployed with airbags that do not interfere with operation of the vehicle 10 being deployed when an instability incident is determined based on lesser thresholds. Other safety devices, like a seatbelt pretensioner 84 which removes slack from a seat belt to improve performance of the seat belt, can be actuated without interfering with an operator's view or ability to control the vehicle 10, and may be implemented at lower thresholds, if desired.

In at least some implementations, actuating an external alert 80 is accomplished by actuating at least one light visible from outside of the vehicle 10, and/or by actuating an audio output device to create a sound or noise detectable outside the vehicle 10. The light or lights may include hazard signals of the vehicle 10, such as intermittently turning on and off (e.g. flashing or blinking) turn signal indicators 88 (FIG. 1) and/or other lights of the vehicle 10, which may include one or more of vehicle headlights 90 and vehicle taillights 92 and interior lights of the vehicle 10. With further reference to FIG. 1, in at least some implementations, the audio output device is a vehicle horn 94 such as may be otherwise actuated by an operator of the vehicle 10, or the audio output may be activating a siren 96 or playing a sound over a speaker or other output device 98 arranged to provide sound outside the vehicle 10.

In at least some implementations, the vehicle control measure includes providing an internal alert within an interior of the vehicle 10. The alert may include illuminating a warning indicator on a vehicle display 56, actuating an audible output like an alarm or message, or both audible and visual alerts which may be done via the infotainment system 51. Such alerts may include directions for driver control of the vehicle 10, which may visually or audibly guide the vehicle operator to reduce speed and/or maneuver the vehicle 10 to a safe location at which the vehicle 10 can be stopped.

In at least some implementations, reducing the vehicle speed is accomplished by actuating one or more brake assemblies 100 (FIG. 1) of the vehicle 10. The brake assembly or assemblies 100 may be used for normal operating braking of the vehicle 10 and/or this step may involve actuating a parking brake system 102 (FIG. 1). This can be done in vehicles arranged for autonomous or semi-autonomous use in which the control system 24 is capable of actuating a brake system 16 for emergency braking when a collision is determined to be likely absent such action, or braking associated with normal vehicle operation. This step may also include controlling the prime mover 12 (and/or a transmission or gearset thereof) to interrupt or stop a positive torque output from the prime mover 12 to avoid the prime mover 12 from attempting to propel the vehicle 10. In this regard, for a tire temperature that is detected above a tire temperature threshold, the method may include reducing vehicle speed or limiting a maximum speed of the vehicle 10 to limit additional heating of the tire(s). At a lower speed, the tire temperature may reduce sufficiently for normal vehicle operation to be resumed. Accordingly, reducing vehicle speed may allow continued vehicle movement or it may involve fully stopping the vehicle 10, and this may depend upon the severity of the tire condition detected, as desired.

In at least some implementations, the vehicle control measure includes reducing the vehicle speed and also includes controlling a steering direction of the vehicle 10. To improve the steering control, the system and method may monitor the location of obstacles above a threshold size that are outside the vehicle 10. This may be done with object detection sensors 50 like LIDAR sensors, RADAR sensors and cameras, by way of non-limiting examples. The system may also use lane detection sensors 48 to control the vehicle 10 as a function of the lanes of the road on which the vehicle 10 is traveling. Controlling the steering direction may include actuating the steering system 23 to change the steering angle of the vehicle 10 to move the vehicle 10 to an area without obstacles above the threshold size, to avoid such obstacles and a collision therewith, or to find an area in which the vehicle 10 can be stopped without a collision. This can be done in vehicles arranged for autonomous or semi-autonomous use in which the control system 24 is capable of actuating a steering actuator (e.g. a motor arranged to move part of the steering system, such as but not limited to a steering input/wheel or steering shaft) to change the steering angle as a function of feedback from one or more sensors (e.g. lane and object detecting sensors, navigation and map data and the like).

As noted above with regard to actuating a safety system 78, the system and method may utilize more than one threshold. For example, different thresholds established for one or both of tire pressure and tire temperature, and the different threshold may relate to different severity of conditions and be used to implement different control measures or to actuate the control measures at different rates or intensities. A tire pressure that decreases more gradually than a maximum rate of decrease threshold, or a tire temperature that is above one threshold but below another threshold, or if the pressure and temperature thresholds are exceeded at a lower rate of vehicle speed, may result in a lower level of safety system actuation up to and including no actuation, a lower level of vehicle braking or a lower level of speed reduction up to an including none, and a lower level of alert being provided externally or internally of the vehicle 10, up to and including none (at least with regard to the external alert(s), where, in at least some implementations, an alert is provided within the vehicle 10 whenever a threshold is exceeded). Conversely, a higher rate of pressure loss, or a pressure below a low threshold or a temperature above a highest threshold, or exceeding lower thresholds while the vehicle 10 is traveling above a threshold speed may cause one or more control measure actuations, and the intensity or severity of the actuations may increase at higher vehicle speeds at which loss of vehicle control is more likely and which can lead to more severe vehicle impacts.

After actuating a vehicle control measure, the method 70 may continue to step 104 in which it is determined if the vehicle operation has ended in which case, the method may end. If not, for example when speed is reduced or an internal alert issued but vehicle operation allowed to continue, the method 70 may return to step 72 in which tire pressure and tire temperature are monitored.

Figure 4:
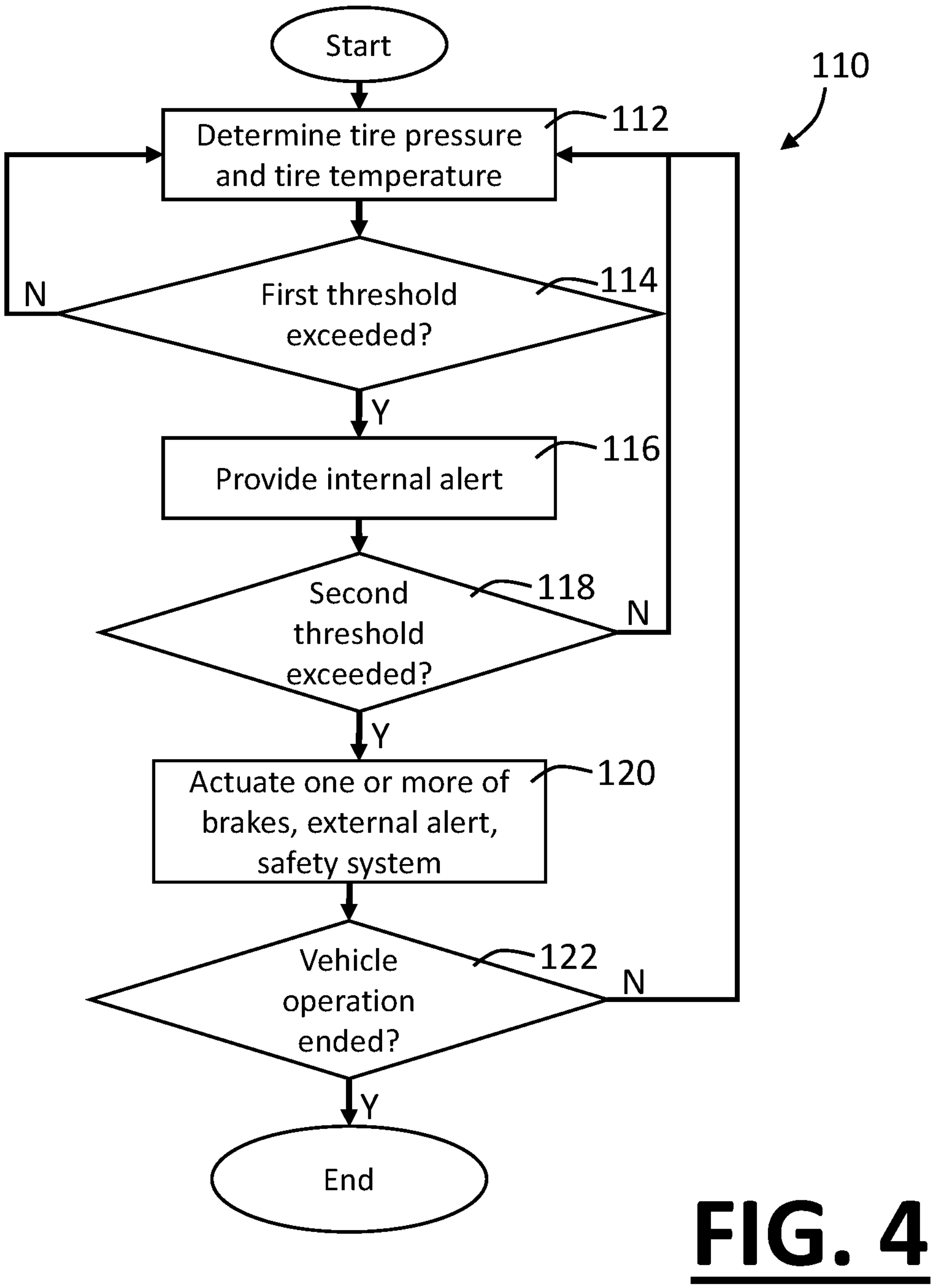
FIG. 4 is a flowchart of a method of controlling the vehicle during a tire instability incident.

FIG. 4 illustrates a method 110 in which tire pressure and tire temperature are monitored in step 112, and in step 114 it is determined if a first threshold has been exceeded, where the first threshold relates to tire pressure or tire temperature but does not indicate a high likelihood of imminent tire failure. If a first threshold is exceeded, then in step 116 an internal alert is provided, such as may be done via the infotainment system 51, to alert the vehicle operator or other occupant to the tire condition. If in step 114 it is determined that a first threshold is not exceeded, then the method 110 returns to step 112 for continued monitoring of tire pressures and tire temperatures.

The method 110 then continues to step 118 in which it is determined if a second threshold has been exceeded, where the second threshold relates to tire pressure or tire temperature but indicates a high likelihood of tire failure or that a tire has already failed. If a second threshold has not been exceeded, then the method 110 returns to step 112 for continued monitoring of tire pressures and tire temperatures. If a second threshold has been exceeded, then the method 110 continues to step 120 in which one or more of the vehicle speed is reduced (e.g. terminating prime mover output, actuating a brake system), an external alert is provided and a safety system is actuated, as set forth herein. Next, it is determined if vehicle operation has ended, and if so, the method may end.

With the system and methods described herein, tire temperature and tire pressure can be monitored, and control measures can be taken when a tire instability incident is determined to have occurred or to be likely. The control measures may improve the safety of vehicle occupants and seek to avoid a collision of the vehicle 10. The control measures may also provide notice to and improve the safety of persons and things outside the vehicle 10 that may be endangered when the vehicle 10 loses control. This can be accomplished both by some control over the vehicle speed and/or direction, and by providing notice outside the vehicle 10, either or both audible or visual, to alert people that the vehicle 10 is in distress and to facilitate avoidance of the vehicle 10 by others.

What is claimed is:

1. A method of controlling a vehicle during a tire instability incident, comprising:

detecting a tire instability incident as a function of tire temperature above a threshold temperature; and activating a vehicle control measure including one or a combination of two or more of: a) actuating a safety system; b) actuating an external alert; and c) reducing a vehicle speed, wherein the threshold temperature is a first threshold that is less than a second threshold temperature, and wherein when a tire temperature is detected that is above the second threshold temperature, the method includes stopping the vehicle or preventing operation of the vehicle until the tire temperature is below the second threshold temperature.

2. The method of claim 1 wherein activating the safety system is accomplished by deploying at least one airbag in the vehicle.

3. The method of claim 1 wherein activating the safety system is accomplished by actuating at least one seat belt pretensioner.

4. The method of claim 1 wherein actuating an external alert is accomplished by actuating at least one light visible from outside of the vehicle.

5. The method of claim 4 wherein the at least one light includes hazard signals of the vehicle, or vehicle headlights or vehicle taillights.

6. The method of claim 1 wherein actuating an external alert is accomplished by actuating an audio output device to create a sound detectable outside the vehicle.

7. The method of claim 6 wherein the audio output device is a vehicle horn.

8. The method of claim 1 wherein the vehicle control measure includes providing an alert within an interior of the vehicle.

9. The method of claim 8 wherein the alert includes illuminating a warning indicator on a vehicle display, actuating an audible alarm or both.

10. The method of claim 8 wherein the alert includes directions for driver control of the vehicle.

11. The method of claim 1 wherein reducing the vehicle speed is accomplished by actuating one or more brake assemblies of the vehicle.

12. The method of claim 11 wherein the one or more brake assemblies includes a parking brake system.

13. The method of claim 1 wherein the vehicle control measure includes reducing the vehicle speed and also includes controlling a steering direction of the vehicle.

14. The method of claim 13 which includes monitoring the location of obstacles above a threshold size that are outside the vehicle, and wherein controlling the steering direction includes changing the steering angle of the vehicle to move the vehicle to an area without obstacles above the threshold size.

15. The method of claim 1 wherein the threshold temperature is a first threshold that is less than a second threshold temperature, and wherein when a tire temperature is detected that is above the second threshold temperature, the method includes stopping the vehicle or preventing operation of the vehicle until the tire temperature is below the second threshold temperature.

16. A method of controlling a vehicle during a tire instability incident, comprising:

detecting a tire instability incident as a function of tire temperature above a threshold temperature; and activating a vehicle control measure including one or a combination of two or more of: a) actuating a safety system; b) actuating an external alert; and c) reducing a vehicle speed, the method also includes determining a vehicle speed and wherein, when the tire temperature is above the threshold temperature and the vehicle speed is above a speed threshold, the activating step includes reducing vehicle speed and limiting a maximum speed at which the vehicle can be operated to a speed below the speed threshold.

17. The method of claim 1 wherein the step of reducing the vehicle speed includes limiting a maximum speed at which the vehicle can be operated.

* * * * *